United States Patent
Natarajan

(10) Patent No.: US 7,418,639 B2
(45) Date of Patent: Aug. 26, 2008

(54) TEST INTERFACE, SYSTEM, AND METHOD FOR TESTING COMMUNICATIONS DEVICES WITH NON-DETERMINISTIC LATENCY

(75) Inventor: Udaya S. Natarajan, Eldorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 660 days.

(21) Appl. No.: 10/202,624

(22) Filed: Jul. 22, 2002

(65) Prior Publication Data

US 2004/0015763 A1    Jan. 22, 2004

(51) Int. Cl.
*G01R 31/28*    (2006.01)
(52) U.S. Cl. ..................... 714/724; 714/742
(58) Field of Classification Search ............... 714/724, 714/718, 719, 712, 715; 370/412, 459; 380/48, 380/2, 9
See application file for complete search history.

(56) References Cited

U.S. PATENT DOCUMENTS

| | | | | |
|---|---|---|---|---|
| 5,063,595 A | * | 11/1991 | Ballance | 370/522 |
| 5,235,685 A | * | 8/1993 | Caldara et al. | 710/313 |
| 5,251,204 A | * | 10/1993 | Izawa et al. | 370/249 |
| 5,383,196 A | * | 1/1995 | Morton | 714/712 |
| 5,414,707 A | * | 5/1995 | Johnston et al. | 370/395.6 |
| 5,701,306 A | * | 12/1997 | Arai | 714/724 |
| 6,243,805 B1 | * | 6/2001 | Mahurin | 712/233 |
| 2002/0176389 A1 | * | 11/2002 | Colombo et al. | 370/338 |

FOREIGN PATENT DOCUMENTS

DE    000547271 A1  * 12/1991

OTHER PUBLICATIONS

Udaya N. Shankar, Test Challenges for SONET/SDH Physical Layer OC3 Devices and Beyond, Oct. 28, 2001, Publication ITC International Test Conference IEEE.*
Yantchev, J.T. et al., Low-Latency Asynchronous FIFO Buffers. Mar. 1995, IEEE, 0-8186-7098-3/95, pp. 24-31.*
Cypress Semiconductor Corporation, CY7C408A Data Sheet 1994, pp. 1-16.*
Udaya N. Shankar; Test Challenges For Sonet/SDH Physical Layer OC3 Devices and Beyond; Publication ITC International Test Conference IEEE Oct. 28, 2001.

* cited by examiner

*Primary Examiner*—Jacques Louis-Jacques
*Assistant Examiner*—John J. Tabone, Jr.
(74) *Attorney, Agent, or Firm*—Fish & Richardson P.C.

(57) ABSTRACT

A test interface is configured to connect to a testing device and a communications device. The communications device may be configured to receive a data signal (that includes a desired data portion) from the test machine. The interface may include a data capture device and a buffer. The data capture device may be configured to receive a framing pulse signal from the communications device, to receive a framing pulse enable signal from the testing device, and to generate a reset signal in response to receiving the framing pulse signal and the framing pulse enable signal. The buffer may be configured to store the data signal from the communications device, and to clear all stored data in the buffer and store the desired data portion in response to receiving the reset signal.

35 Claims, 5 Drawing Sheets

TEST INTERFACE, SYSTEM, AND METHOD FOR TESTING COMMUNICATIONS DEVICES WITH NON-DETERMINISTIC LATENCY

BACKGROUND

The following description relates to testing of communications devices, and more particularly to testing of communications devices with non-deterministic latency.

A communications device may be configured to transmit and receive data using a communications medium. For example, a SONET transceiver or framer may transmit and receive data using an optical network including microwave, coaxial, twisted pair, and fiber optic connections. The SONET transceiver may include a number of analog circuits, such as, for example, an automatic gain control circuit, an equalizer, a phase-locked loop, and a data recovery circuit. A SONET framer may include a number of first-in, first-out buffers (FIFOs). Data may be received at a line side of the transceiver or framer and output to a system side of the transceiver or framer.

Because the transceiver includes a number of analog circuits, and the framer includes a number of FIFOs, SONET communications devices do not have a predictable signal propagation time/phase alignment between the line side and the system side. In other words, the data that travel through the communications device have a non-deterministic latency between the time the data are received and the time that the data are output.

A communications device may be tested to verify operational performance, to certify that the device satisfies operational standards and specifications, and to ensure the quality of the device before the device is shipped or installed. When testing a communications device, a testing machine may inject or input a test data payload in the line side of the device, and receive processed test data on the system-side of the device. However, if the communication device has a non-deterministic latency between the line side and the system side, then data output at the system side after being input to the communications device must be processed to determine where a desired data portion (e.g., a data packet) in the output data is located.

The processing needed to locate a desired data portion adds a delay to the total time needed to test each communications device. As a result, the time required to test each device may be significant when testing a large number of devices.

DESCRIPTION OF DRAWINGS

Like reference symbols in the various drawings indicate like elements.

DETAILED DESCRIPTION

Figure 1:
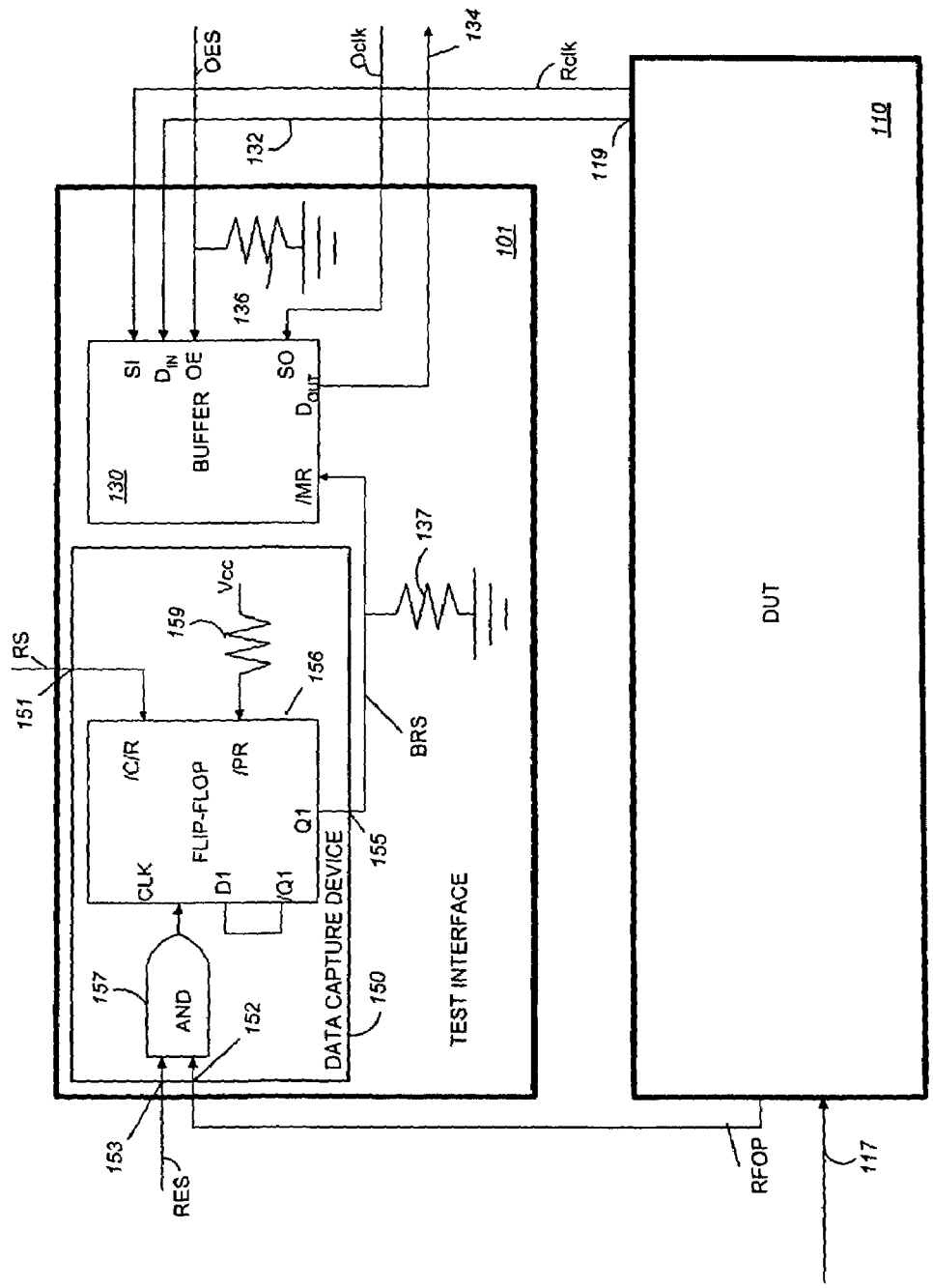
FIG. 1 is an exemplary block diagram of a test interface.

FIG. 1 shows a test system 100 that includes a test interface 101 that may be configured to link a testing device (not shown) and a device under test (DUT) 110. The DUT 110 may be a communications device, such as, for example, a SONET transceiver or framer.

The DUT 110 may include one or more inputs 117 configured to receive data signals including data packets, or a desired data portion, from one or more communications media, such as, for example, microwave, coaxial, twisted pair, and fiber optic connections. The DUT 110 may include a number of components (not shown) to receive, process, and transmit the data signals, including, for example, an automatic gain control circuit, an equalizer, a phase-locked loop, a clock, a data recovery circuit, and/or a number of FIFOs. The components may generate a non-deterministic latency between data that are input to the DUT 110 and the data that are output from the DUT 110.

The DUT 110 may process and output data from the received data signal, for example, to compensate for noise introduced by the communications medium. The DUT 110 also may generate a receive frame output pulse (RFOP) signal that indicates that a data packet, or a desired portion of the data signal, is being output at an output 119 of the DUT 110. For example, a SONET OC3 data packet is preceded by six framing bytes, such as, for example, "A1A1A1A2A2A2." The DUT 110 may generate an RFOP after the last framing byte (e.g., the third "A2,") is output from output 119.

The test interface 101 may include a buffer 130. The buffer 130 may be configured to store or capture data from the DUT 110 during testing. The buffer 130 may be implemented using, for example, a FIFO. However, other storage devices capable of sequentially storing data may be used. In one implementation, a CY7C408 FIFO may be used.

The buffer 130 may include an input $D_{in}$, and an input SI. The input $D_{in}$ may be configured to connect to a data bus 132 to receive data from the output 119 of the DUT 110. The bus 152 may be implemented using, for example, an 8 bit bus. The input SI may be configured to receive a recovered clock Rclk associated with the data received from data bus 132. The recovered clock may be used to clock data received at input Din for storage in the buffer 130.

The buffer 130 also may include an output $D_{out}$, an input OE, an input SO, and an input /MR. The output $D_{out}$ may be configured to sequentially output data stored in the buffer 130 (in the order that the data was stored) to a data bus 134 connected to, for example, the testing device. The data bus 134 may be implemented using, for example, an 8 bit bus. The input SO may be configured to receive a clock signal Oclk from the testing device to clock the data output to the data bus 134. The input OE may be configured to receive an output enable signal ES from the testing device to begin output of data to the data bus 134. The input OE may be connected in parallel with a resistive element 136. The input /MR may be configured to receive a buffer reset signal BRS to clear data stored in the buffer 130. The input /MR may be connected in parallel with a resistive element 137.

The test interface 101 also may include a data capture device 150. The data capture device 150 may be used to asynchronously capture data from the DUT 110 during testing for storage in the buffer 130. The data capture device 150 may include three inputs 151, 152, and 153. Input 151 may be configured to receive a reset signal RS from the testing device that causes the data capture device 150 to reset. Input 152 may be configured to receive the RFOP signal from the DUT 110. Input 153 may be configured to receive an RFOP enable signal RES. Receipt of the REOP enable signal RES and the RFOP signal causes the data capture device 150 to output a buffer reset signal BRS at output 155. The buffer reset signal BRS resets the buffer 130 by clearing its contents. The output 155 of the data capture device 150 may be connected to the input /MR of the buffer 130 and in parallel with the resistive element 137.

The data capture device 150 may be implemented using a sequential element or circuit, such as, for example, a latch or a flip-flop 156, and a combinational element or circuit, such as, for example, an AND gate 157.

In the illustrated implementation, the flip-flop 156 may be a 7474LVTTL flip-flop. The power reset /PR input of flip-flop 156 may be connected to a power supply for the test interface 101 (e.g., Vcc) through a resistive element 159. The /C/R input of flip-flop 156 may be connected to input 151. The delay input D1 of flip-flop 156 may be connected to the complementary output /Q1. The output Q1 of flip-flop 156 may connected to output 155. When the AND gate 157 receives the RFOP signal and the RFOP enable signal RES, a high potential is applied to the clk input of flip-flop 156, which causes the flip-flop 156 to generate the buffer reset signal BRS at output Q1.

Figure 2:
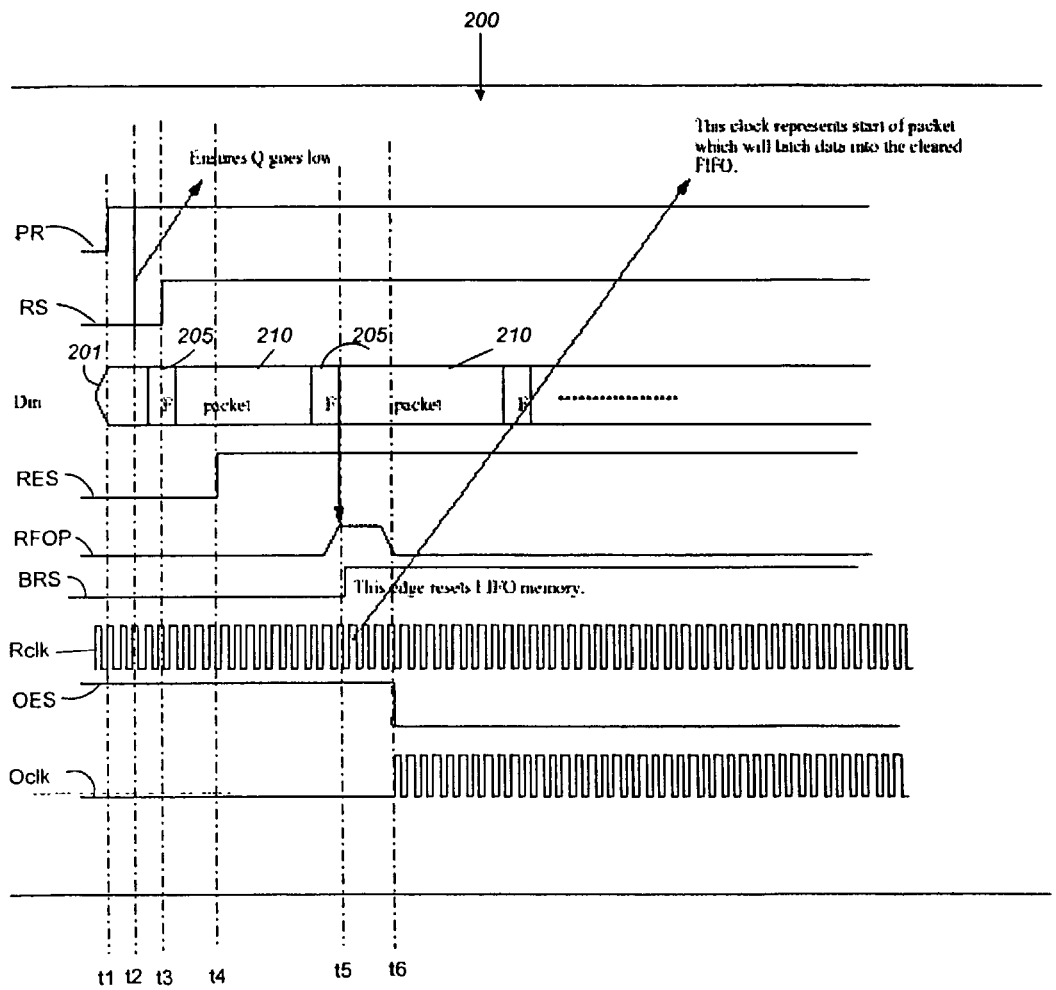
FIG. 2 is an exemplary timing diagram for the test interface of FIG. 1.

FIG. 2 shows a timing diagram 200 for the operation of the interface 101 of FIG. 1. Data signal 201 may be input to the buffer 130 from the DUT 110. The data signal 201 may include framing signals 205 and packets 210. When power is supplied to the interface 101 at t1, the input PR of flip-flop 156 is held to a high potential. Initially, a low potential is applied to input RS 151 of the data capture device 150, and, therefore, to the input RS of flip-flop 156. The combination of a low input on input RS (/C/R) and a high input on PR at t2 cause a low potential at output 155 (BRS).

Before testing, the testing device generates a reset signal RS on input 151 at t3. The testing device also generates an RFOP enable signal RES on input 153 at t4 to enable the data capture device 150.

After the last framing byte (e.g., the third "A2" in an OC3 signal) of the framing signal 205, the DUT 110 generates an RFOP signal at t5 to indicate that the beginning of a packet 210 is being output from the output 119 of the DUT 110 to $D_{in}$ of the buffer 130. Because both inputs 152 and 153 to AND gate 157 are high, the AND gate 157 outputs a high potential to the clk input of the flip-flop 156. As a result, the flip-flop 156 outputs a buffer reset signal BRS at t5 to clear any data stored in the buffer 130. The recovered clock Rclk associated with the data signal 201 output from DUT 110 is received at input SI of buffer 130. The recovered clock Rclk is used to store the data packet 210 in the buffer 130.

Before the buffer 130 is filled, the test device applies an output enable signal OES at t6 to input OE of the buffer 130 to enable data to be read from the buffer 130. An output clock Oclk generated by the test device may be provided to input SO at t6 to clock the data that is output from the buffer 130 to the data output bus 134.

Because the buffer 130 is cleared substantially simultaneously with the receipt of the RFOP signal at t5, the first data stored in the buffer is the beginning of the data packet 210. In this way, when the testing device reads the data packet 210 from the buffer 130, no additional processing is necessary to locate the beginning of the data packet 210 (or a desired portion of signal 201). The above-described approach provides an inexpensive and efficient way of capturing data from a communications device that has a non-deterministic latency.

Figure 3:
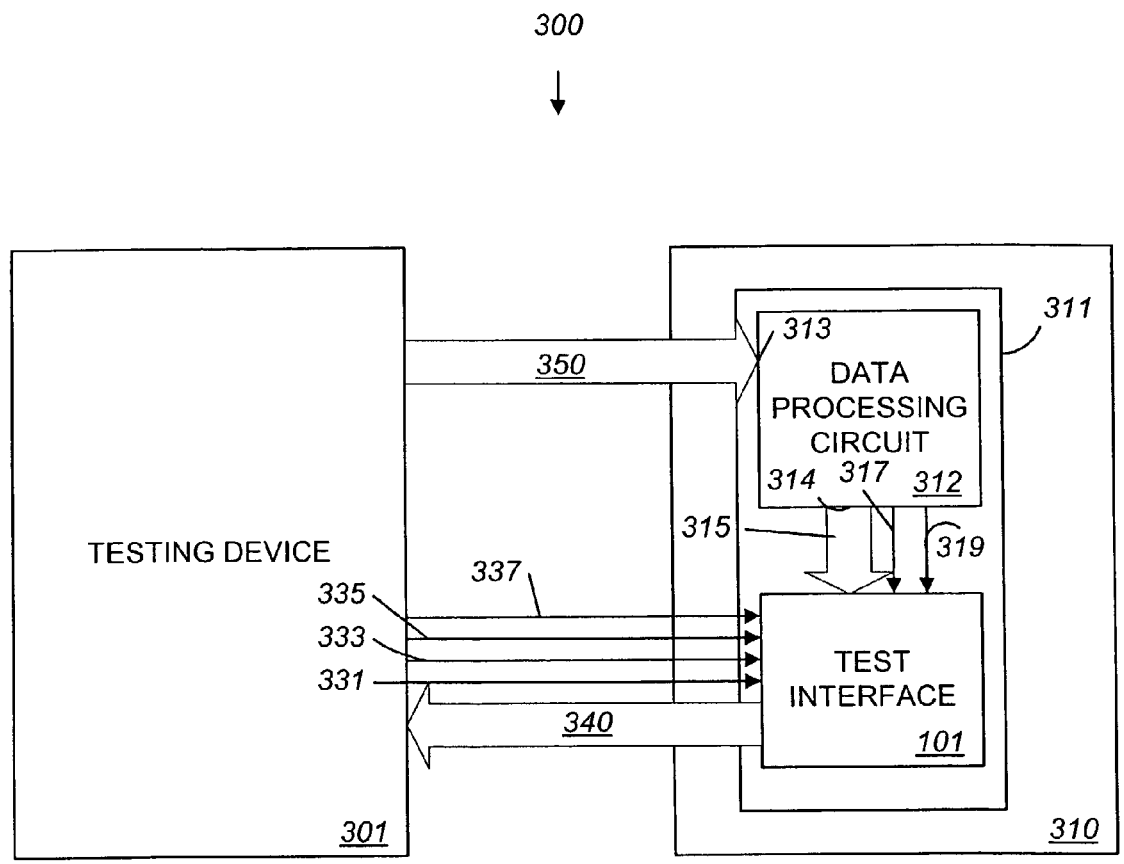
FIGS. 3, 4, and 5 are exemplary block diagrams of testing systems including the test interface of FIG. 1.

As shown in FIG. 3, a test system 300 may include a testing device 301 and a communications device 310, which may be, for example, a SONET device. The testing device 301 may be used to test various functions of and the performance of the communications device 310.

The communications device 310 may include a communications board 311 including a data processing circuit 312, such as, for example, a transceiver or a framer. The processing circuit 312 may be used to, for example, enhance, filter, and amplify the data signal. The processing circuit 312 may include a line-side input 313 configured to receive the data signal, and a system side output 314 configured to transmit a processed data signal.

A test interface 101 may be connected to the communications board 311. The test interface 101 may be configured to receive the processed data on a bus 315. In addition, the interface may be configured to receive a recovered clock signal 317, and an RFOP signal 319. The test interface 101 also may be configured to receive a number of signals from the testing device 301, such as, for example, an RFOP enable signal 331, a reset signal 333, an output enable signal 335, and an output clock signal 337. The test interface 101 may output data to the testing device 301 using data bus 340.

During testing, the testing device 301 may input a data signal or payload including one or more desired data portions to the communications device 310 using bus 350. The data processing circuit receives the data payload at input 313, processes the data payload, and outputs the processed data to output 314. The test interface 101 stores the processed data as the processed data is output from the data processing circuit 312 according to the clock signal 317.

The testing device 301 provides the RFOP enable signal 331 to activate the test interface 101. When the test interface 101 receives the RFOP signal (in combination with the RFOP enable signal), the test interface 101 clears all stored data received from the communications device 310 and begins reading in a desired data portion of the data payload.

The test interface 101 begins output of the stored desired data portion upon receipt of the output enable signal 335 from the testing device 301. The stored desired data portion is then output on data bus 340 using the clock 337.

After testing, the test interface 101 may be removed from the communications device 310 (e.g., before the communications device 310 is shipped). The test interface 101 may be reused to test other communications devices 310.

Figure 4:
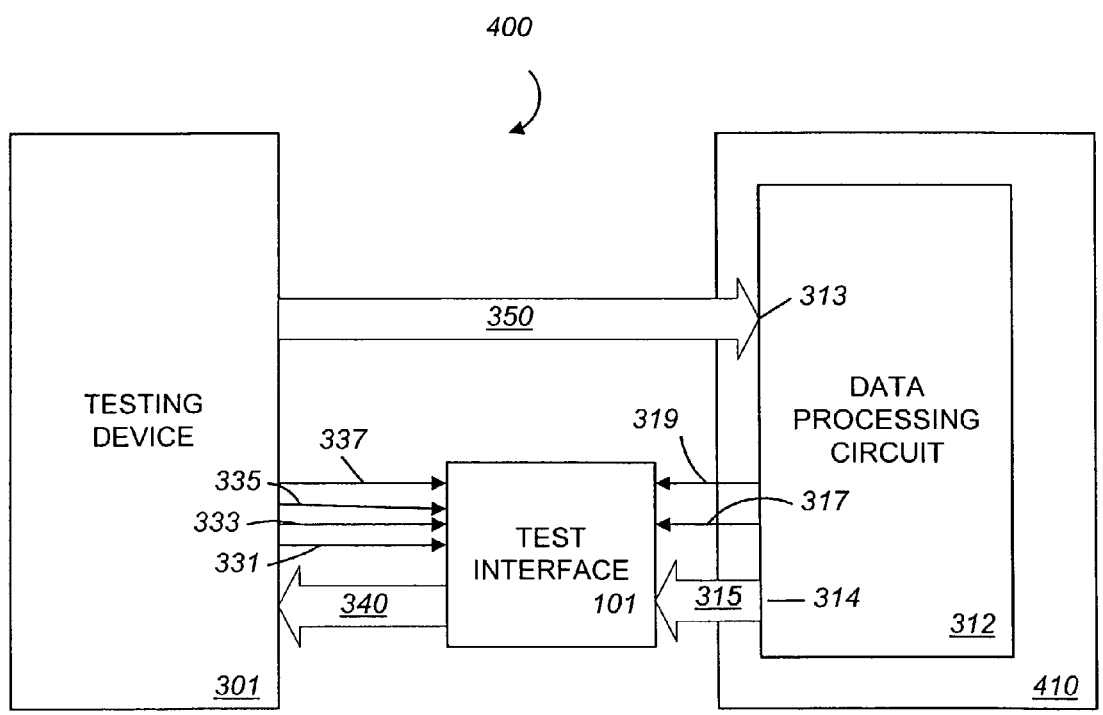

As shown in FIG. 4, a test system 400 includes a testing device 301 connected to a communications device 410. The test system 400 is similar in operation to test system 300, but differs in that the test interface 101 is not attached to or inserted in the communications device 410. Instead, the test interface 101 may be connected between the test machine 301 and the communications device 410.

Figure 5:
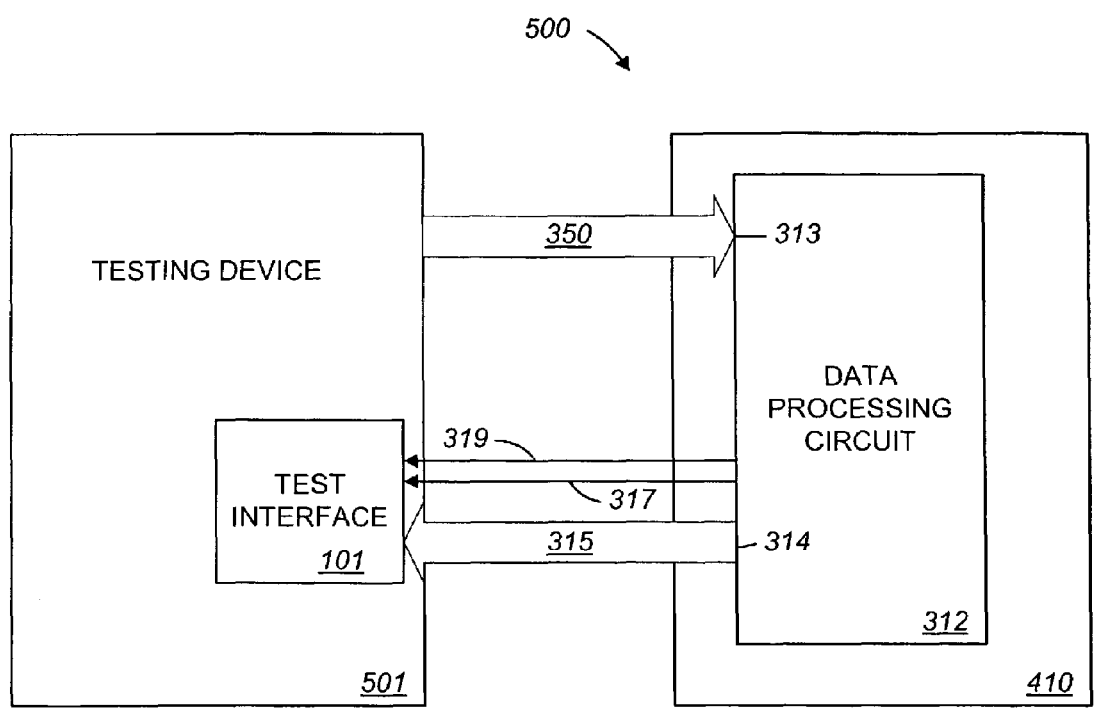

As shown in FIG. 5, a test system 500 includes a testing device 501 and a communication device 410. The test system 500 is similar in operation to test systems 300 and 400, but differs in that the test interface 101 may be incorporated with the test machine 501.

A number of exemplary implementations have been described. Nevertheless, it will be understood that various modifications may be made. For example, advantageous results may be achieved if the steps of the disclosed techniques are performed in a different order and/or if components in a disclosed architecture, device, or circuit are combined in a different manner and/or replaced or supplemented by other components. Accordingly, other implementations are within the scope of the following claims.

What is claimed is:

1. A test interface to connect to a testing device and a communications device, the communications device configured to receive testing device input data including a desired data portion from the testing device, the test interface comprising:

a data capture device to receive a framing pulse signal indicating packet boundaries from packets received at the communications device, to receive a framing pulse enable signal from the testing device, and to generate a desired data signal in response to receiving the framing pulse signal and the framing pulse enable signal; and a buffer to store the desired data portion in response to receiving a recovered clock from the communications device.

2. The test interface of claim 1 wherein the buffer is a first-in, first-out buffer.

3. The test interface of claim 1 wherein the buffer includes an input to receive a clock signal associated with the data signal for use in storing the data signal in the buffer.

4. The test interface of claim 1 wherein the buffer includes an input to receive an output enable signal and an output clock from the testing device to enable output of the desired portion from the buffer.

5. The test interface of claim 1 wherein the data capture device includes a sequential logic circuit and a combinational logic circuit that are configured to generate the desired data signal.

6. The test interface of claim 5 wherein the sequential logic circuit is a flip-flop and the combinational logic circuit is an AND gate.

7. The test interface of claim 1 wherein the data signal is a synchronous optical network signal and the desired portion is a packet.

8. The test interface of claim 1 wherein the desired data signal is a reset signal and the buffer is configured to clear all data stored in the buffer in response to receiving the reset signal.

9. A system comprising:
a communications device to receive testing device input data signal including a desired portion from a testing device, to process the data signal, to output the processed data signal, and to generate a framing pulse signal; and
a test interface to capture the desired data portion output from the communications device, the test interface including
a data capture device to receive the framing pulse signal indicating packet boundaries, to receive a framing pulse enable signal from the testing device, and to generate a desired data signal in response to receiving the framing pulse signal and the framing pulse enable signal; and
a buffer to store the desired data portion in response to receiving a recovered clock from the communications device.

10. The system of claim 9 wherein the buffer is a first-in, first-out buffer.

11. The system of claim 10 wherein the desired data signal is a reset signal and the buffer is configured to clear all data stored in the buffer in response to receiving the reset signal.

12. The system of claim 9 wherein the buffer includes an input to receive a clock signal associated with the data signal for use in storing the data signal in the buffer.

13. The system of claim 9 wherein the buffer includes an input to receive an output enable signal and an output clock signal from a testing device to enable the desired portion to be read from the buffer.

14. The system of claim 9 wherein the data capture device includes a sequential logic circuit and a combinational logic circuit.

15. The system of claim 14 wherein the sequential logic circuit is a flip-flop and the combinational logic circuit is an AND gate.

16. The system of claim 9 wherein the data signal is a synchronous optical network signal and the desired portion is a packet.

17. A device comprising:
a testing device to test a communications device and to input testing device input data including a desired data portion to the communications device; and
a test interface including:
a data capture device to receive a framing pulse indicating packet boundaries from packets received at the communications device, to receive a control pulse from the testing device, and to generate a desired data signal in response to receiving the framing pulse and the control pulse; and
a buffer to store the desired data portion in response to receiving a recovered clock from the device under test.

18. The device of claim 17 wherein the buffer is a first-in, first-out buffer.

19. The device of claim 17 wherein the buffer includes an input to receive a clock signal associated with the data signal for use in storing the data signal in the buffer.

20. The device of claim 17 wherein the buffer includes an input to receive an output enable signal and an output clock signal from a testing device to enable the desired portion to be read from the buffer.

21. The device of claim 17 wherein the data capture device includes a sequential logic circuit and a combinational logic circuit.

22. The device of claim 21 wherein the sequential logic circuit is a flip-flop and the combinational logic circuit is an AND gate.

23. The device of claim 17 wherein the data signal is a synchronous optical network signal and the desired portion is a packet.

24. The device of claim 17 wherein the desired data signal is a reset signal and the buffer is configured to clear all data stored in the buffer in response to receiving the reset signal.

25. A system comprising:
a communications device;
a testing device to test the communications device and to input to the communications device testing device input data including a desired portion; and
a test interface including
a data capture device to receive a framing pulse indicating packet boundaries from packets received at the communications device, to receive a control pulse from the testing device, and to generate a desired data signal in response to receiving the framing pulse and the control pulse; and
a buffer to store the desired data portion in response to receiving a recovered clock from the device under test.

26. The system of claim 25 wherein the buffer is a first-in, first-out buffer.

27. The system of claim 25 wherein the buffer includes an input to receive a clock signal associated with the data signal for use in storing the data signal in the buffer.

28. The system of claim 25 wherein the buffer includes an input to receive an output enable signal and an output clock signal from a testing device to enable the desired portion to be read from the buffer.

29. The system of claim 25 wherein the data capture device includes a sequential logic circuit and a combinational logic circuit.

30. The system of claim 29 wherein the sequential logic circuit is a flip-flop and the combinational logic circuit is an AND gate.

31. The system of claim 25 wherein the signal is a synchronous optical network signal and the desired portion is a packet.

32. The system of claim 25 wherein the desired data signal is a reset signal and the buffer is configured to clear all data stored in the buffer in response to receiving the reset signal.

33. A method for testing a communication device, the method comprising:

inputting testing device input including a desired data portion into a communications device;

receiving a framing enable pulse signal from a testing device;

receiving a framing pulse signal indicating packet boundaries from packets received at the communications device based on the testing device input data;

generating a desired data signal in response to receiving the framing pulse signal and the framing pulse enable signal; and storing the desired data portion substantially simultaneously after receiving a recovered clock from the device under test.

34. The method of claim 33 further comprising clearing a memory in response to the desired data signal before storing the desired data portion of the test signal.

35. The method of claim 34 wherein the desired data signal is a reset signal.

* * * * *